(12) United States Patent
Zhang et al.

(10) Patent No.: US 11,548,158 B2
(45) Date of Patent: Jan. 10, 2023

(54) AUTOMATIC SENSOR CONFLICT RESOLUTION FOR SENSOR FUSION SYSTEM

(71) Applicant: ABB Schweiz AG, Baden (CH)

(72) Inventors: Biao Zhang, West Hartford, CT (US); Jianjun Wang, West Hartford, CT (US); Yixin Liu, New Britain, CT (US); Saumya Sharma, Hartford, CT (US); Jorge Vidal-Ribas, Sant Cugat del Vallès (ES); Jordi Artigas, Barcelona (ES); Ramon Casanelles, Sant Cugat del Vallès (ES)

(73) Assignee: ABB Schweiz AG, Baden (CH)

( * ) Notice: Subject to any disclaimer, the term of this patent is extended or adjusted under 35 U.S.C. 154(b) by 239 days.

(21) Appl. No.: 16/851,946

(22) Filed: Apr. 17, 2020

(65) Prior Publication Data

US 2021/0323164 A1 Oct. 21, 2021

(51) Int. Cl.
*B25J 9/16* (2006.01)
*B25J 13/08* (2006.01)

(52) U.S. Cl.
CPC .......... *B25J 9/1694* (2013.01); *B25J 9/1653* (2013.01); *B25J 9/1674* (2013.01); *B25J 13/089* (2013.01)

(58) Field of Classification Search
CPC ...... B25J 9/1694; B25J 9/1653; B25J 9/1674; B25J 13/089; B25J 9/1692; B25J 9/0093; B25J 9/1669; B25J 9/1687; B25J 9/1684; B25J 13/088; B25J 9/1697; G06V 10/62; G06V 2201/06; G05B 2219/25428; G05B 2219/37331; G05B 2219/40412; G05B 23/0221; G05B 19/41815; G05B 19/4182;
(Continued)

(56) References Cited

U.S. PATENT DOCUMENTS

| | | | |
|---|---|---|---|
| 2016/0283813 A1* | 9/2016 | Ishihara | G06V 40/103 |
| 2017/0274275 A1* | 9/2017 | Vandonkelaar | A63F 13/35 |
| 2019/0039237 A1* | 2/2019 | Nakashima | B25J 9/1669 |

(Continued)

FOREIGN PATENT DOCUMENTS

WO    WO-2017135905 A1 *   8/2017

*Primary Examiner* — Abby Y Lin
*Assistant Examiner* — Esvinder Singh
(74) *Attorney, Agent, or Firm* — Leydig, Voit & Mayer, Ltd.

(57) ABSTRACT

A system and method that automatically resolves conflicts among sensor information in a sensor fusion robot system. Such methods can accommodate converging ambiguous and divergent sensor information in a manner that can allow continued, and relatively accurate, robotic operations. The processes can include handling sensor conflict via sensor prioritization, including, but not limited, prioritization based on the particular stage or segment of the assembly operation when the conflict occurs, overriding sensor data that exceeds a threshold value, and/or prioritization based on evaluations of recent sensor performance, predictions, system configuration, and/or historical information. The processes can include responding to sensor conflicts through comparisons of the accuracy of workpiece location predictions from different sensors during different assembly stages in connection with arriving at a determination of which sensor(s) is providing accurate and reliable predictions.

14 Claims, 9 Drawing Sheets

(58) Field of Classification Search
CPC .......... G05B 2219/39102; G05B 2219/40554; G06K 9/6288; G06T 2207/30164
See application file for complete search history.

(56) References Cited

U.S. PATENT DOCUMENTS

| | | | |
|---|---|---|---|
| 2019/0118383 A1* | 4/2019 | Yoshiura | G06T 7/73 |
| 2021/0276197 A1* | 9/2021 | Ye | B25J 19/023 |
| 2021/0299878 A1* | 9/2021 | Konishi | G06T 7/73 |
| 2022/0072931 A1* | 3/2022 | Chen | B60H 1/3232 |

* cited by examiner

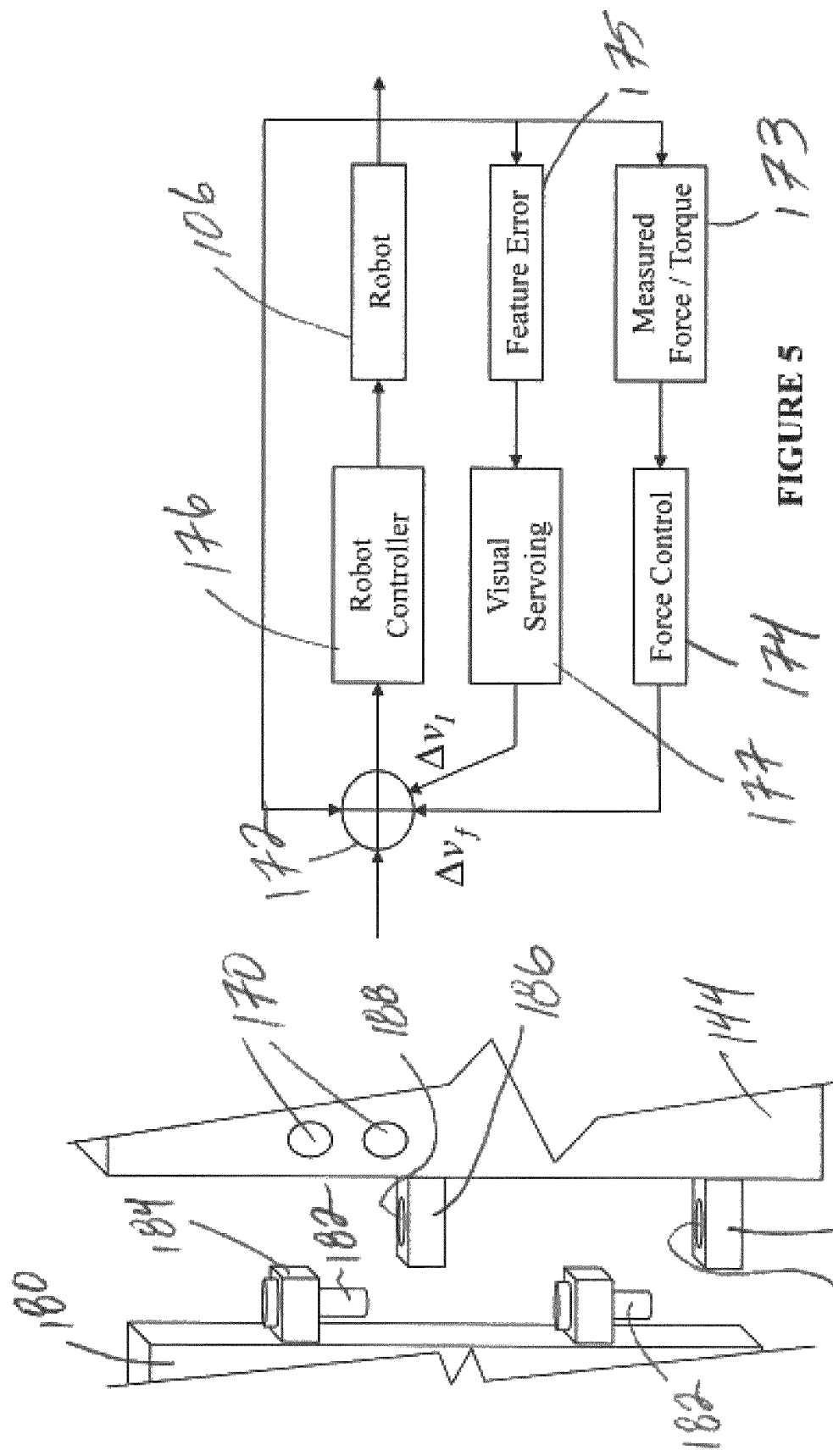

AUTOMATIC SENSOR CONFLICT RESOLUTION FOR SENSOR FUSION SYSTEM

FIELD OF INVENTION

The present invention relates to robotic assemblies, and more particularly, to conflict resolution between multiple sensors of a sensor fusion system for robotic assemblies.

BACKGROUND

A variety of operations can be performed during the final trim and assembly (FTA) stage of automotive assembly, including, for example, door assembly, cockpit assembly, and seat assembly, among other types of assemblies. Yet, for a variety of reasons, only a relatively small number of FTA tasks are typically automated. For example, often during the FTA stage, while an operator is performing an FTA operation, the vehicle(s) undergoing FTA is/are being transported on a line(s) that is/are moving the vehicle(s) in a relatively continuous manner. Yet such continuous motions of the vehicle(s) can cause or create certain irregularities with respect to at least the movement and/or position of the vehicle(s), and/or the portions of the vehicle(s) that are involved in the FTA. Moreover, such stop and go motion can cause the vehicle to be subjected to movement irregularities, vibrations, and balancing issues during FTA, which can prevent, or be adverse to, the ability to accurately model or predict the location of a particular part, portion, or area of the vehicle that directly involved in the FTA. Further, such movement irregularities can prevent the FTA from having a consistent degree of repeatability in terms of the movement and/or positioning of each vehicle, or its associated component, as each subsequent vehicle and/or component passes along the same area of the assembly line. Accordingly, such variances and concerns regarding repeatability can often preclude the use of traditional teach and repeat position based robot motion control in FTA operations.

Accordingly, although various robot control systems are available currently in the marketplace, further improvements are possible to provide a system and means to calibrate and tune the robot control system to accommodate such movement irregularities.

BRIEF SUMMARY

An aspect of an embodiment of the present application is a method that includes predicting, using information from a plurality of sensors, a location of a workpiece. Additionally, a conflict can be determined between information from at least some of the plurality of sensors. Further, a robot can be displaced to a first location that is determined using the predicted location of the workpiece, and an actual location of the workpiece can be detected. Further, a sensor can be identified from the plurality of sensors that provided the information that resulted in the closest prediction of the actual location of the workpiece.

Another aspect of an embodiment of the present application is a method that can include tracking, by a plurality of sensors, movement of a workpiece along a robotic assembly operation, and applying, for each sensor of the plurality of sensors, information obtained by tracking movement of the workpiece to determine a predicted workpiece location. Additionally, one or more of the predicted workpiece locations can be assigned a weighted value, and the predicted workpiece location for each of the plurality of sensors and the weighted value can be used to determine an adjusted predicted workpiece location. Further, a robot can be displaced to a location that is determined, at least in part, using the adjusted predicted workpiece location.

Additionally, an aspect of an embodiment of the present application is a method that can include detecting if both a natural tracking feature and an artificial tracking feature are in a field of view of a vision device of a vision guidance system, and determining, if both the natural tracking feature and the artificial tracking feature are detected in the field of view, a reliability of the detection of the natural tracking feature. Additionally, the method can include referencing the artificial tracking feature for tracking the natural tracking feature based on a determination of the reliability of the natural tracking feature.

These and other aspects of the present application will be better understood in view of the drawings and following detailed description.

BRIEF DESCRIPTION OF THE DRAWINGS

The description herein makes reference to the accompanying figures wherein like reference numerals refer to like parts throughout the several views.

FIG. 4 illustrates portions of an exemplary vehicle door and workpiece having mating hinge components.

FIG. 5 illustrates an exemplary process for automatic correction of a conflict between multiple sensors in a robot system according to an embodiment of the subject application.

Figure 1:
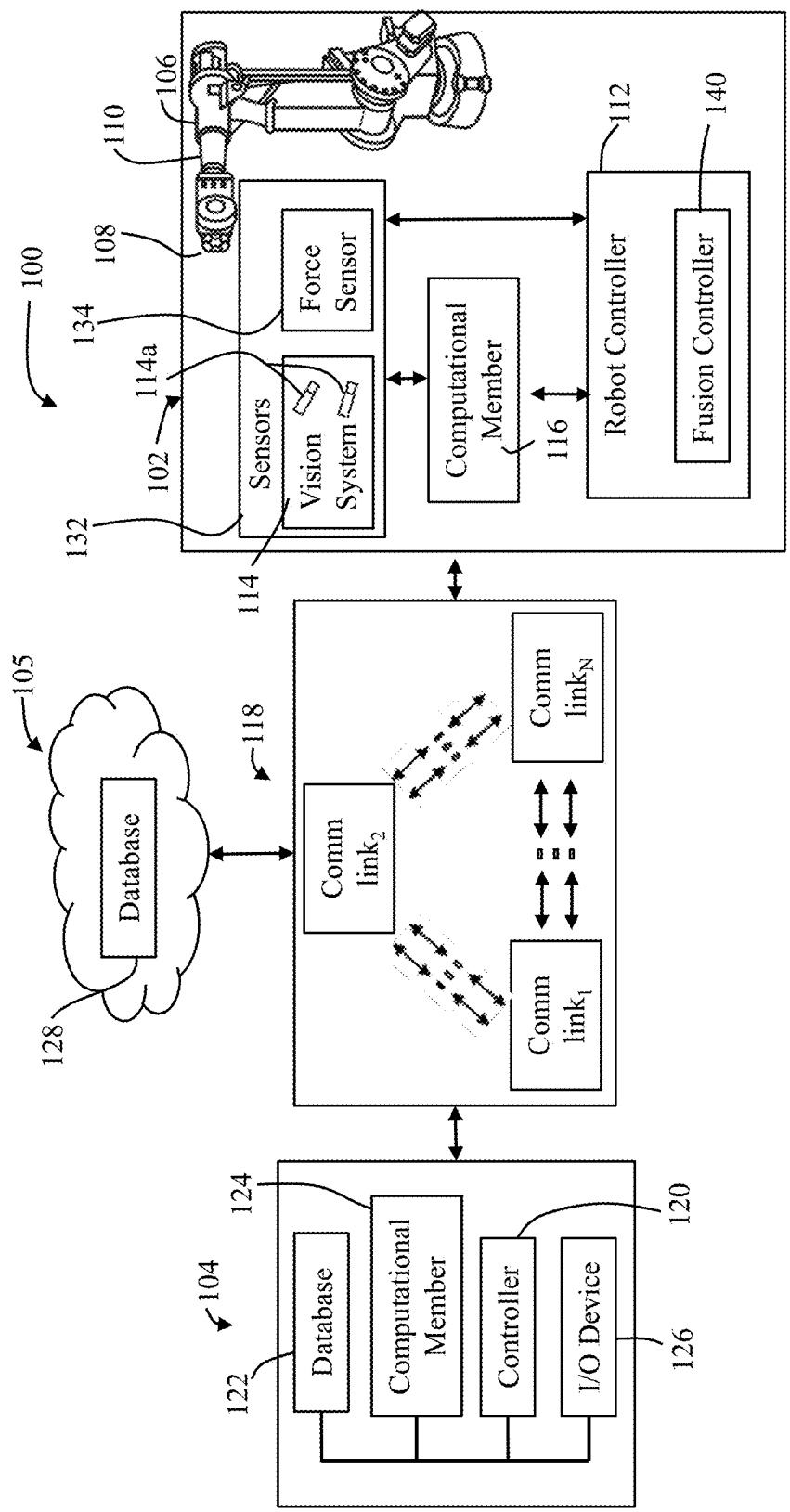
FIG. 1 illustrates a schematic representation of at least a portion of an exemplary robot system according to an illustrated embodiment of the present application.

The foregoing summary, as well as the following detailed description of certain embodiments of the present application, will be better understood when read in conjunction with the appended drawings. For the purpose of illustrating the application, there is shown in the drawings, certain embodiments. It should be understood, however, that the present application is not limited to the arrangements and instrumentalities shown in the attached drawings. Further, like numbers in the respective figures indicate like or comparable parts.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

FIG. 1 illustrates at least a portion of an exemplary robot system 100, which can be a sensor fusion robot system, that includes at least one robot station 102 that is communicatively coupled to at least one robotic control system 104, such as, for example, via a communication network or link 118. The robotic control system 104 can be local or remote relative to the robot station 102. Further, according to certain embodiments, the robot station 102 can also include, or be in operable communication with, one or more supplemental database systems 105 via the communication network or link 118. The supplemental database system(s) 105 can have a variety of different configurations. For example, according to the illustrated embodiment, the supplemental database system(s) 105 can be, but is not limited to, a cloud based database.

According to the illustrated embodiment, the robotic control system 104 can include at least one controller 120, a database 122, the computational member 124, and/or one or more input/output (I/O) devices 126. The robotic control system 104 can be configured to provide an operator direct control of the robot 106, as well as to provide at least certain programming or other information to the robot station 102 and/or for the operation of the robot 106. Moreover, the robotic control system 104 can be structured to receive commands or other input information from an operator of the robot station 102 or of the robotic control system 104, including, for example, via commands generated via operation or selective engagement of/with an input/output device 126. Such commands via use of the input/output device 126 can include, but are not limited to, commands provided through the engagement or use of a microphone, keyboard, touch screen, joystick, stylus-type device, and/or a sensing device that can be operated, manipulated, and/or moved by the operator, among other input/output devices. Further, according to certain embodiments, the input/output device 126 can include one or more monitors and/or displays that can provide information to the operator, including, for, example, information relating to commands or instructions provided by the operator of the robotic control system 104, received/transmitted from/to the supplemental database system(s) 105 and/or the robot station 102, and/or notifications generated while the robot 102 is running (or attempting to run) a program or process. For example, according to certain embodiments, the input/output device 126 can display images, whether actual or virtual, as obtained, for example, via use of at least a vision device 114a of a vision guidance system 114.

The robotic control system 104 can include any type of computing device having a controller 120, such as, for example, a laptop, desktop computer, personal computer, programmable logic controller (PLC), or a mobile electronic device, among other computing devices, that includes a memory and a processor sufficient in size and operation to store and manipulate a database 122 and one or more applications for at least communicating with the robot station 102 via the communication network or link 118. In certain embodiments, the robotic control system 104 can include a connecting device that can communicate with the communication network or link 118 and/or robot station 102 via an Ethernet WAN/LAN connection, among other types of connections. In certain other embodiments, the robotic control system 104 can include a web server, or web portal, and can use the communication network or link 118 to communicate with the robot station 102 and/or the supplemental database system(s) 105 via the internet.

The supplemental database system(s) 105, if any, can also be located at a variety of locations relative to the robot station 102 and/or relative to the robotic control system 104. Thus, the communication network or link 118 can be structured, at least in part, based on the physical distances, if any, between the locations of the robot station 102, robotic control system 104, and/or supplemental database system(s) 105. According to the illustrated embodiment, the communication network or link 118 comprises one or more communication links 128 (Comm link$_{1-N}$ in FIG. 1). Additionally, the system 100 can be operated to maintain a relatively reliable real-time communication link, via use of the communication network or link 118, between the robot station 102, robotic control system 104, and/or supplemental database system(s) 105. Thus, according to certain embodiments, the system 100 can change parameters of the communication link 128, including, for example, the selection of the utilized communication links 128, based on the currently available data rate and/or transmission time of the communication links 128.

The communication network or link 118 can be structured in a variety of different manners. For example, the communication network or link 118 between the robot station 102, robotic control system 104, and/or supplemental database system(s) 105 can be realized through the use of one or more of a variety of different types of communication technologies, including, but not limited to, via the use of fiber-optic, radio, cable, or wireless based technologies on similar or different types and layers of data protocols. For example, according to certain embodiments, the communication network or link 118 can utilize an Ethernet installation(s) with wireless local area network (WLAN), local area network (LAN), cellular data network, Bluetooth, ZigBee, point-to-point radio systems, laser-optical systems, and/or satellite communication links, among other wireless industrial links or communication protocols.

The database 122 of the robotic control system 104 and/or one or more databases 128 of the supplemental database system(s) 105 can include a variety of information that can be used in the identification of elements within the robot station 102 in which the robot 106 is operating. For example, one or more of the databases 122, 128 can include or store information that is used in the detection, interpretation, and/or deciphering of images or other information detected by a vision guidance system 114, such as, for example, information related to tracking feature(s) that may be detected in an image(s) captured by the by the vision guidance system 114. Additionally, or alternatively, such databases 122, 128 can include information pertaining to one or more sensors 132, including, for example, information pertaining to forces, or a range of forces, that are to be expected to be detected by via use of one or more force sensors 134 at one or more different locations in the robot station 102 and/or along the workpiece 144 at least as work is performed by the robot 106.

The database 122 of the robotic control system 104 and/or one or more databases 128 of the supplemental database system(s) 105 can also include information that can assist in discerning other features within the robot station 102. For example, images that are captured by the one or more vision devices 114a of the vision guidance system 114 can be used in identifying, via use of information from the database 122, components within the robot station 102, including FTA components that are within a picking bin, among other components, that may be used by the robot 106 in performing FTA on a workpiece, such as, for example, a car body or vehicle.

According to certain embodiments, the robot station 102 includes one or more robots 106 having one or more degrees of freedom. For example, according to certain embodiments, the robot 106 can have, for example, six degrees of freedom. According to certain embodiments, an end effector 108 can be coupled or mounted to the robot 106. The end effector 108 can be a tool, part, and/or component that is mounted to a wrist or arm 110 of the robot 106. Further, at least portions of the wrist or arm 110 and/or the end effector 108 can be moveable relative to other portions of the robot 106 via operation of the robot 106 and/or the end effector 108, such for, example, by an operator of the robotic control system 104 and/or by programming that is executed to operate the robot 106.

The robot 106 can be operative to position and/or orient the end effector 108 at locations within the reach of a work envelope or workspace of the robot 106, which can accommodate the robot 106 in utilizing the end effector 108 to perform work, including, for example, grasp and hold one or more components, parts, packages, apparatuses, assemblies, or products, among other items (collectively referred to herein as "components"). A variety of different types of end effectors 108 can be utilized by the robot 106, including, for example, a tool that can grab, grasp, or otherwise selectively hold and release a component that is utilized in a final trim and assembly (FTA) operation during assembly of a vehicle, among other types of operations.

Figure 2:
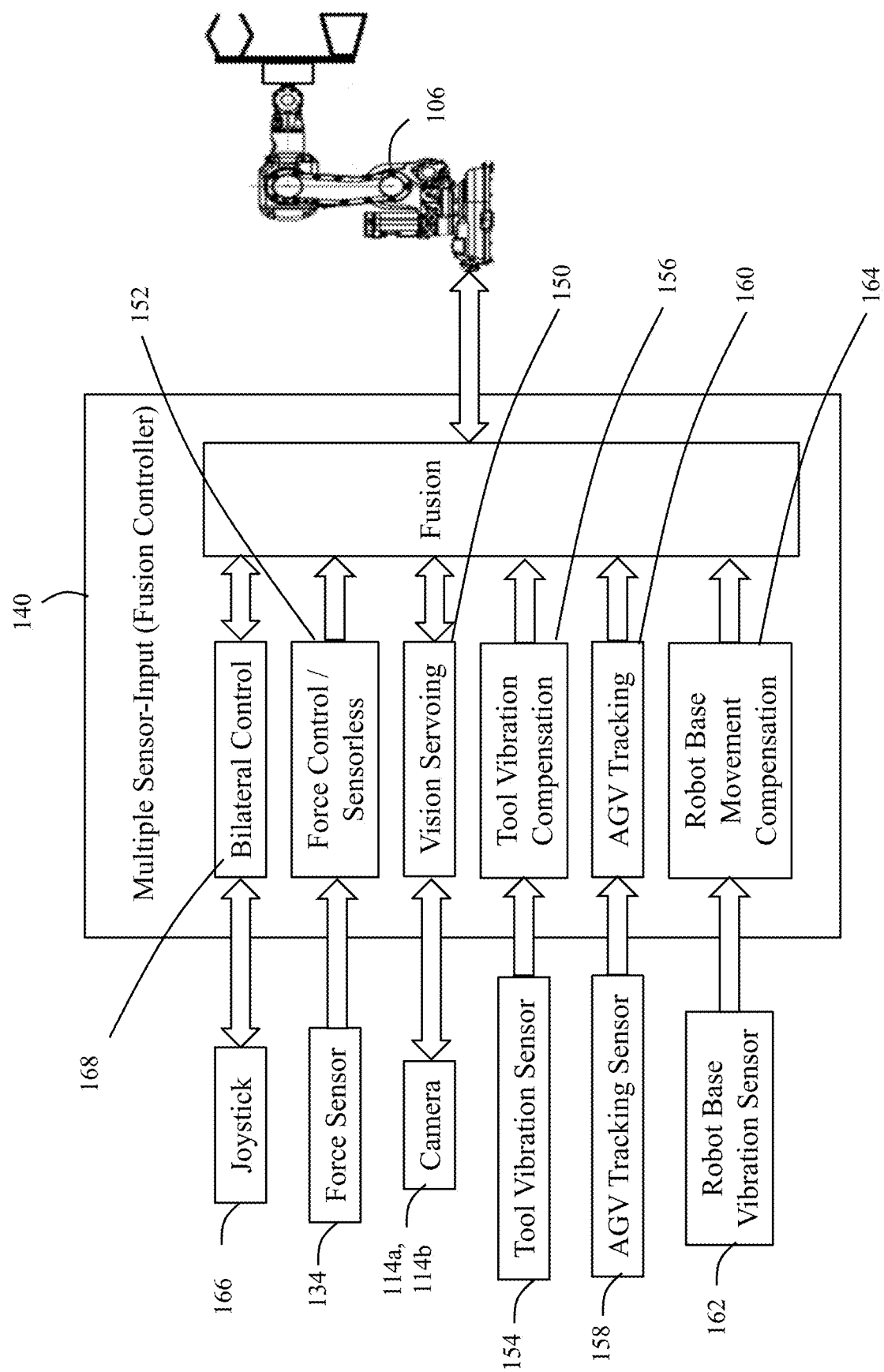
FIG. 2 illustrates exemplary fusion controller and a related representation of communications of the fusion controller with a robot, and with a plurality of sensors and input devices.

The robot 106 can include, or be electrically coupled to, one or more robotic controllers 112. For example, according to certain embodiments, the robot 106 can include and/or be electrically coupled to one or more controllers 112 that may, or may not, be discrete processing units, such as, for example, a single controller or any number of controllers. The controller 112 can be configured to provide a variety of functions, including, for example, be utilized in the selective delivery of electrical power to the robot 106, control of the movement and/or operations of the robot 106, and/or control the operation of other equipment that is mounted to the robot 106, including, for example, the end effector 108, and/or the operation of equipment not mounted to the robot 106 but which are an integral to the operation of the robot 106 and/or to equipment that is associated with the operation and/or movement of the robot 106. Moreover, according to certain embodiments, the controller 112 can be configured to dynamically control the movement of both the robot 106 itself, as well as the movement of other devices to which the robot 106 is mounted or coupled, including, for example, among other devices, movement of the robot 106 along, or, alternatively by, a track 130 or mobile platform such as the automated guided vehicle (AGV) to which the robot 106 is mounted via a robot base 142, as shown in FIG. 2.

The controller 112 can take a variety of different forms, and can be configured to execute program instructions to perform tasks associated with operating the robot 106, including to operate the robot 106 to perform various functions, such as, for example, but not limited to, the tasks described herein, among other tasks. In one form, the controller(s) 112 is/are microprocessor based and the program instructions are in the form of software stored in one or more memories. Alternatively, one or more of the controllers 112 and the program instructions executed thereby can be in the form of any combination of software, firmware and hardware, including state machines, and can reflect the output of discreet devices and/or integrated circuits, which may be co-located at a particular location or distributed across more than one location, including any digital and/or analog devices configured to achieve the same or similar results as a processor-based controller executing software or firmware based instructions. Operations, instructions, and/or commands determined and/or transmitted from the controller 112 can be based on one or more models stored in non-transient computer readable media in a controller 112, other computer, and/or memory that is accessible or in electrical communication with the controller 112.

According to the illustrated embodiment, the controller 112 includes a data interface that can accept motion commands and provide actual motion data. For example, according to certain embodiments, the controller 112 can be communicatively coupled to a pendant, such as, for example, a teach pendant, that can be used to control at least certain operations of the robot 106 and/or the end effector 108.

The robot station 102 and/or the robot 106 can also include one or more sensors 132, as well as other forms of input devices. Examples of sensors 132 that can be utilized in connection with the operation of the robot 106 includes, for example, vision sensors, force sensors, motion sensors, acceleration sensors, and/or depth sensors, among other types of sensors. Further, information provided by at least some of the sensors 132 can be integrated, including, for example, via operation of a fusion controller 140 (FIG. 2), such that operations and/or movement, among other tasks, by the robot 106 can at least be guided via sensor fusion. Such a fusion controller 140 can be part of, or otherwise communicatively coupled to, a controller 112 and/or a computational member 116 of the robotic control system 104. Moreover, information provided by the one or more sensors 132, such as, for example, the vision guidance system 114 and force sensors 134, among other sensors 132, can be processed by the fusion controller 140 such that the information provided by the different sensors 132 can be combined or integrated in a manner that can reduce the degree of uncertainty in the movement and/or performance of tasks by the robot 106. For example, as discussed below, according to certain embodiments, at least a plurality of the sensors 132 can provide information to the fusion controller 140 that the fusion controller 140 can use to determine a location to which the robot 106 is to move and/or to which the robot 106 is to move a component that is to be assembled to a workpiece.

Moreover, as shown in FIG. 2, according to at least certain embodiments, the sensors 132 can include, but are not limited to, one or more vision devices 114a, 114b of the vision guidance system 114 that is/are used in connection with vision servoing 150. According to such an embodiment, the vision guidance system 114 can be configured to process images captured by one or more vision devices 114a, 114b of the vision guidance system 114, as well as provide information from such image processing for vision servoing 150 for the fusion controller 140 and/or robot 106. Similarly, the fusion controller 140 can be communicatively coupled to at least operably receive data and information from, for example: a force sensor 134 that can be utilized with force control and/or sensorless force control module 152; a tool vibration sensor 154 that can be used with tool vibration compensation module 156; an AGV tracking sensor 158 that can be utilized with an AGV tracker module 160; and/or a robot base vibration sensor 162 that can be utilized with robot base movement compensation module 164. Additionally, information can be exchange between a joystick 166 that utilizes bilateral control module 168 and the fusion controller 140. Further, as indicated by FIG. 2, the fusion controller 140 can also be communicatively coupled to the exchange information and data with the robot 106.

According to the illustrated embodiment, the vision guidance system 114 can comprise one or more vision devices 114a, 114b that can be used in connection with observing at least portions of the robot station 102, including, but not limited to, observing, workpieces 144 and/or components that can be positioned in, or are moving through or by at least a portion of, the robot station 102. For example, according to certain embodiments, the vision guidance system 114 can visually detect, track, and extract information, various types of visual features that can be part of, or otherwise positioned on or in proximity to, the workpiece 144 and/or components that are in the robot station 102. For example, the vision guidance system 114 can track and capture images of, as well as possibly extract information from such images, regarding visual tracking features that are part of, or positioned on a FTA component and/or car body that is/are involved in an assembly process, and/or on automated guided vehicle (AGV) that is moving the workpiece through the robot station 102.

Figure 3:
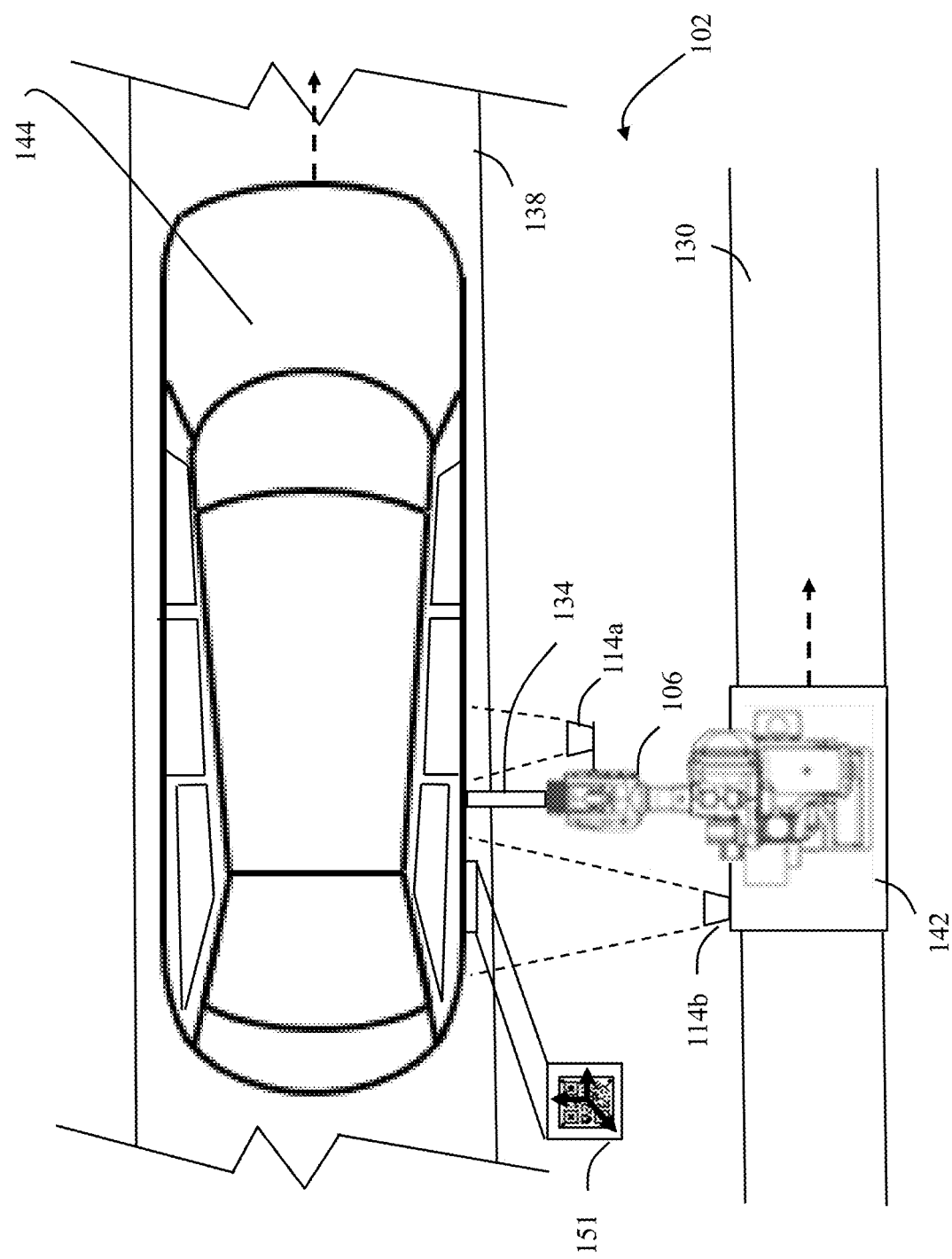
FIG. 3 illustrates a schematic representation of an exemplary robot station through which workpieces are moved by an automated or automatic guided vehicle (AGV), and in which a robot that is mounted to a robot base is moveable along, or by, a track.

Examples of vision devices 114a, 114b of the vision guidance system 114 can include, but are not limited to, one or more imaging capturing devices, such as, for example, one or more two-dimensional, three-dimensional, and/or RGB cameras. Additionally, the vision devices 114a, 114b can be mounted at a variety of different locations within the robot station 102, including, for example, mounted generally above the working area of the robot 106, mounted to the robot 106, the end effector 108 of the robot 106, and/or the base 142 on which the robot 106 is mounted and/or displaced, among other locations. For example, FIG. 3 illustrates a robot station 102 in which a first vision device 114a is attached to a robot 106, and a second vision device 114b is mounted to the robot base 142 onto which the robot 106 is mounted. However, the one or more vision devices 114a, 114b can be positioned at a variety of different locations, including, for example, above the robot 106 and/or at a location at which the vision device 114a, 114b generally does not move, among other locations.

According to certain embodiments, the vision guidance system 114 can have data processing capabilities that can process data or information obtained from the vision devices 114a, 114b. Additionally, such processed information can be communicated to the controller 112 and/or fusion controller 140. Alternatively, according to certain embodiments, the vision guidance system 114 may not have data processing capabilities. Instead, according to certain embodiments, the vision guidance system 114 can be electrically coupled to a computational member 116 of the robot station 102 that is adapted to process data or information outputted from the vision guidance system 114. Additionally, according to certain embodiments, the vision guidance system 114 can be operably coupled to a communication network or link 118, such that information outputted by the vision guidance system 114 can be processed by a controller 120 and/or a computational member 124 of the robotic control system 104, as discussed below.

Thus, according to certain embodiments, the vision guidance system 114 or other component of the robot station 102 can be configured to search for certain tracking features within an image(s) that is/are captured by the one or more vision devices 114a, 114b and, from an identification of the tracking feature(s) in the captured image, determine position information for that tracking feature(s). Information relating to the determination of a location of the tracking feature(s) in the captured image(s) can be used, for example, by the vision servoing 150 of the control system 104, as well as stored or recorded for later reference, such as, for example, in a memory or database of, or accessible by, the robotic control system 104 and/or controller 112. Moreover, information obtained by the vision guidance system 114 can be used to at least assist in guiding the movement of the robot 106, the robot 106 along a track 130 or mobile platform such as the AGV (FIG. 3), and/or movement of an end effector 108.

According to certain embodiments, the first and second vision devices 114a, 114b can each individually track at least artificial tracking features and/or natural tracking features. Artificial tracking features can be features that are configured to be, and/or are at a location in the robot station 102, that may be less susceptible to noise, including, for example, noise associated with lighting, movement irregularities, vibrations, and balancing issues, than natural tracking features. Thus, such artificial tracking features can be, but are not limited to, items and/or features that are configured and/or position primarily for use by the vision guidance system 114, and can include, but are not limited to, a quick response (QR) code 151, as shown, for example, in FIG. 3. Alternatively, or additionally, rather than utilizing artificial tracking features, portions of the workpiece 144, or related components, can be utilized that are at a location that is generally less susceptible to noise, including noise associated with movement caused by natural forces, than other portions of the workpiece 144.

With respect to natural tracking features, such features can include, but are not limited to, features of the workpiece 144 at or around the location at which a component will be located, contacted, moved, and/or identified along the workpiece 144 during actual operation of the robot 106. For example, FIG. 4 provides one example of natural tracking features in the form of side holes 170 in a workpiece 144. Thus, the natural tracking features may be related to actual intended usage of the robot 106, such as, for example, locating relatively small holes that will be involved in an assembly operation. Accordingly, in view of at least the size, location, and/or configuration, among other factors, natural tracking features can be inherently more susceptible to a relatively higher level of noise than the artificial tracking features. As such relatively higher levels of noise can adversely affect the reliability of the information obtained by the sensors 132, artificial tracking features may be used during different stages of an assembly process than natural tracking features.

The force sensors 134 can be configured to sense contact force(s) during the assembly process, such as, for example, a contact force between the robot 106, the end effector 108, and/or a component being held by the robot 106 with the workpiece 144 and/or other component or structure within the robot station 102. Such information from the force sensor(s) 134 can be combined or integrated, such as, for example, by the fusion controller 140, with information provided by the vision guidance system 114, including for example, information derived in processing images of tracking features, such that movement of the robot 106 during assembly of the workpiece 144 is guided at least in part by sensor fusion.

FIG. 3 illustrates a schematic representation of an exemplary robot station 102 through which workpieces 144 in the form of car bodies are moved by the automated or automatic guided vehicle (AGV) 138, and which includes a robot 106 that is mounted to a robot base 142 that is moveable along, or by, a track 130 or mobile platform such as the AGV 138. While for at least purposes of illustration, the exemplary robot station 102 depicted in FIG. 3 is shown as having, or being in proximity to, a workpiece 144 and associated AGV 138, the robot station 102 can have a variety of other arrangements and elements, and can be used in a variety of other manufacturing, assembly, and/or automation processes. Additionally, while the examples depicted in FIGS. 1 and 3 illustrate a single robot station 102, according to other embodiments, the robot station 102 can include a plurality of robot stations 102, each station 102 having one or more robots 106. The illustrated robot station 102 can also include, or be operated in connection with, one or more AGVs 138, supply lines or conveyors, induction conveyors, and/or one or more sorter conveyors. According to the illustrated embodiment, the AGV 138 can be positioned and operated relative to the one or more robot stations 102 so as to transport, for example, workpieces 144 that can receive, or otherwise be assembled with or to include, via operation of the robot 106, one or more components. For example, with respect to embodiments in which the workpiece 144 is a car body or vehicle, such components can include a door assembly, cockpit assembly, and seat assembly, among other types of assemblies and components.

Similarly, according to the illustrated embodiment, the track 130 can be positioned and operated relative to the one or more robots 106 so as to facilitate assembly by the robot(s) 106 of components to the workpiece(s) 144 that is/are being moved via the AGV 138. Moreover, the track 130 or mobile platform such as the AGV, robot base 142, and/or robot can be operated such that the robot 106 is moved in a manner that at least generally follows the movement of the AGV 138, and thus the movement of the workpiece(s) 144 that is/are on the AGV 138. Further, as previously mentioned, such movement of the robot 106 can also include movement that is guided, at least in part, by information provided by the vision guidance system 114, one or more force sensor(s) 134, among other sensors 132.

During sensor fusion robot operations, the outputs from different sensors 132 can provide information or data that may be difficult to converge, which can lead to ambiguity in terms of the outputted data and the action, including, for example, the movement that the robot 106 is to take. For example, during an robotic assembly in which a robot 106 is to assemble a door to a car body, information from one sensor could indicate a first direction that the robot is to move the door, while another sensor may indicate that the robot 106 is to move the door in a second, opposite direction. Such variations in the output of data from sensors 132 can create issues with respect to which data is to be deemed reliable, and which data is not to be trusted. The processes 200, 300, 400, and 500 discussed below provide manners in which such conflicts between sensor output can be automatically corrected, and include, for example, handling sensor conflict via sensor prioritization, including, but not limited, prioritization based on the particular stage or segment of the assembly operation when the conflict occurs, overriding sensor data that exceeds a threshold value, and/or prioritization based on historical data.

FIG. 5 illustrates an exemplary process 200 for automatic correction of a conflict between multiple sensors in a robot system 100. The operations illustrated for all of the processes in the present application are understood to be examples only, and operations may be combined or divided, and added or removed, as well as re-ordered in whole or in part, unless explicitly stated to the contrary. As shown, during a robotic assembly operation, force sensor 134 can be utilized to measure a force/torque information 173, such as, for example, a force associated with a component that is being assembled by the robot 106 to the workpiece 144, force associated with the force sensor 134 contacting the workpiece 144, or the robot 106, such as, for example, the end effector 108, having contact with the workpiece 144, among other forces. Such force information can be provided to a force controller 174 that can provide adaptive information, such, as, for example, information that can be used in determining, or altering, the path of movement of the robot 106 and/or component that is being held or coupled to the robot 106. Additionally, such force information can also be used to assist in determining a location of the workpiece 144.

Similarly, as previously discussed, vision devices 114a, 114b can track visual tracking features, including, but not limited to, artificial and natural tracking features, so as to provide information that can at least be used to detect a location of the workpiece 144. Such information captured by the vision devices 114a, 114b can also be used, such as, for example, by the visual servoing 177, to determining, or altering, the path of movement of the robot 106 and/or component that is being held or coupled to the robot 106.

However, in the example depicted in FIG. 5, in at least certain instances, there can be an error (as indicated by "Feature Error" 175 in FIG. 5) in the information captured by the vision devices 114a, 114b, among errors in information from other sensors 132, such as, for example, an error that can be associated with sensor degradation/drift, improper lighting, and/or vibrations, among other possible sources for sensor error. This error may then be passed to the vision servoing 177, which can result the vision servoing 177 providing inaccurate information, such as, for example, in accurate information relating to a location of the workpiece 144.

In the illustrated example, a comparator 172, which can generally correspond to the fusion controller 140, can be configured to utilize information outputted by the force controller 174 and the vision servoing 177 in connection with determining a manner in which the robot 106, and/or associated component, is to be moved. However, due to inaccurate information associated with the "Feature Error" 175, there can be difficulty with respect to comparator converging the information outputted from the force controller 174 and the vision servoing 177. As a consequence of such a conflict, the comparator 172 may be unaware of which of the received data is to be trusted, and thus uncertain as to what related instruction to provide to the robot controller 176 for the operation of the robot 106.

Figure 6:
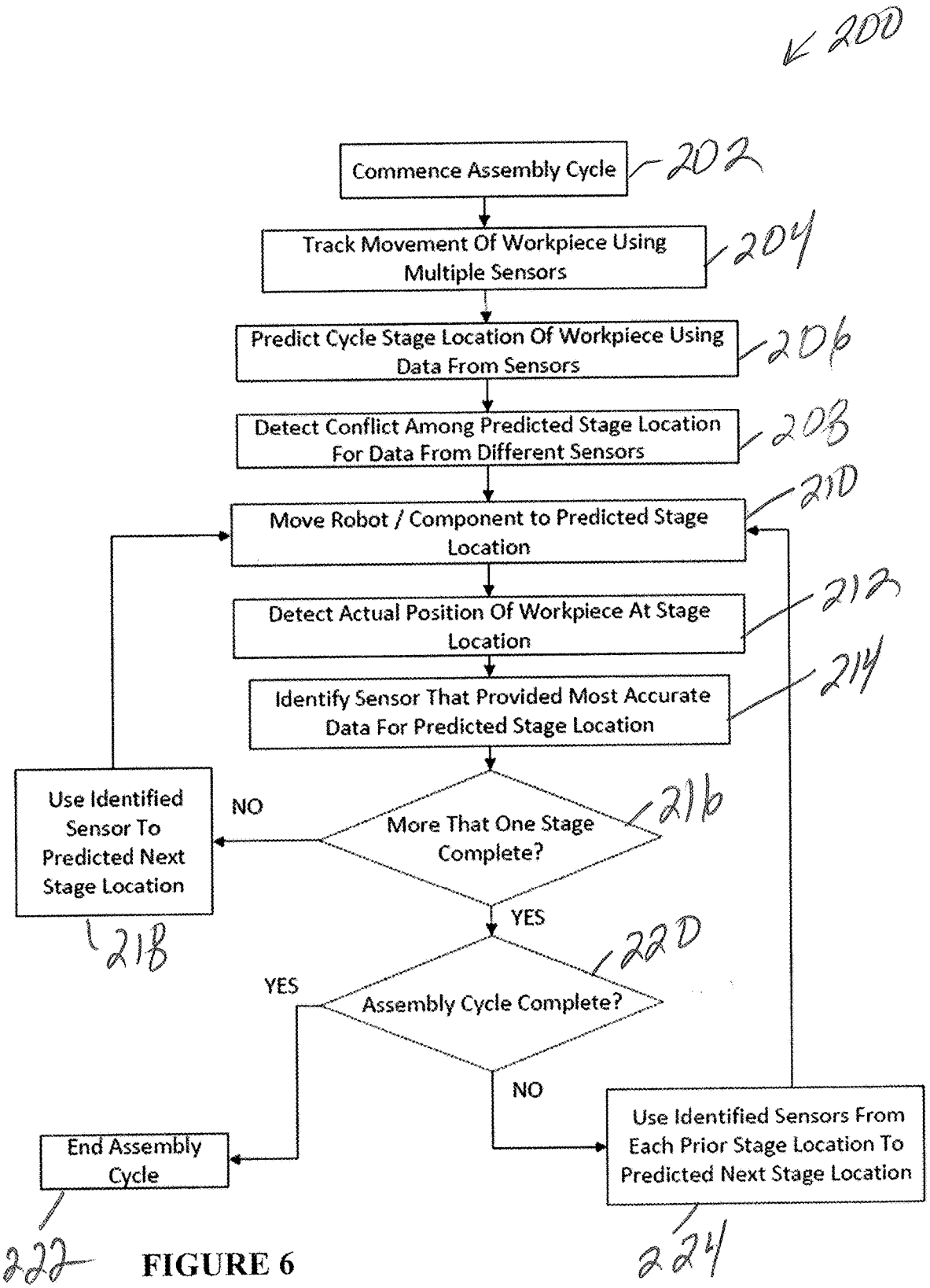
FIG. 6 illustrates an exemplary process for automatic correction of a conflict between multiple sensors in a robot system according to an embodiment of the subject application.

FIG. 6 illustrates an exemplary process 200 for automatic correction of a conflict between multiple sensors in a robotic fusion system. At step 202, the process can begin with the commencement of an assembly cycle. According to certain embodiments, the robotic assembly cycle can comprise a plurality of assembly steps, stages, or segments that can be directed to assembly of a particular component(s) to the workpiece 144. For example, for at least purposes of discussion, referencing FIG. 4, according to certain embodiments, the assembly cycle can involve a series of assembly stages involving the robot 106 assembling a component, such as, for example, a door 180 (FIG. 4) to a workpiece 144 in the form of a car body that is moving along the AGV 138. In such an example, the different assembly stages can involve, but are not limited to, for example: (1) the robot 106 positioning the door 180 at a first assembly stage location at which the door 180 is in relatively close proximity to the continuously moving car body, (2) the robot 106 positioning the door 180 at a second assembly stage location at which pin(s) 182 of the door hinge portion(s) 184 that is/are secured to the door 180 are above and aligned with a mating hole(s) 188 in the corresponding body hinge portion(s) 186 that is/are secured to the car body, and (3) the robot positioning the door 180 at a third assembly stage location at which the pin(s) 182 of the door hinge portion(s) 184 is/are inserted into the hole(s) 188 of the corresponding body hinge portion(s) 186. However, the number of assembly stages, and the specific aspects or tasks associated with those assembly stages, can vary based on a variety of different circumstances and criteria, including, but not limited to, the type of workpieces and components and the associated assembly procedures.

At step 204, the movement of the workpiece 144 can be tracked. For example, at least at the beginning of the assembly stage, the movement of the workpiece 144 can be tracked by a plurality of the sensors 132, including, but not limited to, utilizing information from a plurality of sensors 132. For example, with respect to the vision devices 114a, 114b of the vision guidance system 114, as discussed above, the natural tracking feature or the artificial tracking feature tracked by the first vision device 114a can be the same, or different than, the natural or artificial tracking feature that is tracked by the second vision device 114b. Additionally, the particular feature tracked by the first and second vision device 114a, 114b, may, or may not, be different for different assembly stages of the assembly cycle. Such movement of the workpiece 144 can also be tracked in a variety of other manners, including, but not limited to, forces, or the changes in forces, as detected by one or more force sensors 134, motion sensors, and/or acceleration sensors. The information detected by the one or more sensors 132 can, for example, be used by the control system 104, controller 112, and/or fusion controller 140 to determine at least a current location of the workpiece 144.

At step 206, information from the sensors 134 that are tracking the continuous movement of the workpiece 144 can be used to derive one or more predictions as to an assembly stage location at which the robot 106 is to position a component that is to be assembled to the workpiece 144, such as for example, a door 180 or other FTA component. Such predictions using the data from different sensors 132, which can be provided to the fusion controller 140, can collectively be used via sensor fusion to determine a particular location that the robot 106 is to position the component being held by, or coupled to, the robot 106. Further, these predictions can be derived in a variety of manners, including, for example, by algorithms or software performed by one or more of the controllers of the robot station 102. Further, such predictions can be used to account for possible variances in the assembly operation, including, but not limited to, variances associated with FTA, as previously discussed.

The predictions at step 206 can be a plurality of predictions of the first assembly stage locations, with the each prediction being based on, or having as a variable, information from a different sensor(s) 132. For example, a prediction as to the first assembly stage location for the component being held or coupled to the robot 106 can be derived using, or having as a variable, data or information provided by the first vision device 114a, while another different prediction as to the first assembly stage location can be determined using, or having as a variable, data or information provided by the second vision device 114b. Similarly, other predictions can be based on other sensors, including, but not limited to, the force sensor 134.

At step 208, the control system 104, controller 112, and/or fusion controller 140 may evaluate whether there is a conflict among the predictions provided at step 206. Such a conflict can result from differences in the predicted first assembly stage locations, including, but not limited to, one or more of the predicted first assembly stage locations being different than one or more of the other prediction first assembly stage locations by a threshold amount, which could be a distance, percentage, angle(s), or other values or representations. Such differences in predicted stage locations can be caused for a variety of different reasons, including, but not limited, sensor drift/degradation, sensor failure or interruption, and/or differences in frame rates and/or resolutions of the sensors 132. Further, errors or other situations or can arise in the robot system 100, and/or interference can be created by noise, such as, for example, the presence of a shadow, improper lighting, and vibrations in either or both the workpiece 144 and the robot 106 that can adversely impact the accuracy of the information detected by, or obtained from, one or more of the sensors 132.

If a conflict is not detected, then the assembly stage can continue as planned or programmed toward completion. However, if a conflict is detected during the first assembly stage, then, at step 210, the robot 106 can at least attempt to continue to move the component to the predicted first assembly stage location in response to instructions that uses information from at least some, if not all, of the sensors 132. Then, at step 212, the actual location of the component when moved to the predicted first assembly stage location, the actual position of the workpiece 144, and/or the location of the component at the predicted first assembly stage location relative to the workpiece 144 can be determined or sensed, and the robot 106 can, if necessary, be operated to adjust the location of the component accordingly.

With the actual location of the workpiece 144, or the actual position of the workpiece relative to the component known, the accuracy of the predictions provided at step 206 can be evaluated at step 214. Such an evaluation at step 214 can include identifying which sensor(s) 132 provided data that resulted in the most accurate prediction at step 206, and can be performed, for example, by the control system 104, controller 112, and/or fusion controller 140. Conversely, step 214 can provide an identification of which sensors 132 provided information that was unreliable, or otherwise less reliable or accurate than the data provided by other sensors 132.

Thus for example, at step 214, during the first assembly stage, based on (1) a comparison between the predicted first assembly stage location that was arrived at step 206 using data from the first vision device 114a to the known actual location of the workpiece, and/or of the relative locations of the workpiece 144 and the component at the predicted first assembly stage location, and (2) a similar comparison of the predicted first assembly stage location that was arrived at step 206 using data from the second vision device 114*b* to the known actual location of the workpiece, and/or of the relative locations of the workpiece 144 and the component at the predicted first assembly stage location, one of the first vision device 114*a* and the second vision device 114*b* can be determined to have been, for at least predicting the first assembly stage location, more accurate than the other. This evaluation at step 214 can further include similar evaluations of the predicted locations obtained using the data from other sensors 132, including, but not limited to, the force sensor 134. Thus, at the conclusion of step 214, one or more of the sensors 132 that provided data during the subject assembly stage that was determined have resulted in the most accurate prediction of the first assembly stage location can be identified.

At step 216, a determination can be made, such as, for example, by the control system 104, controller 112, and/or fusion controller 140, as to whether the more than one assembly stage has been completed. For example, the previously discussed example addressed an assembly cycle having three stages. Thus, in this example, following the robot 106 moving the door 180 to a first stage assembly location, the next assembly stage, which has not yet been completed, can commence. As previously mentioned, in the illustrated example, the second assembly stage can be, for example, a stage in which the robot 106 moves the door 180 to the second assembly stage location at which the pin(s) 182 of the door hinge portion(s) 184 are positioned above, and aligned with, the hole(s) 188 of the body hinge portion(s) 186.

Accordingly, at step 218, the one or more sensors 132 identified at step 214 as providing data that resulted in the most accurate prediction as to the first assembly stage location is/are the sensor(s) 132 that is/are used to provide the predicted second stage assembly location to which the robot 106 actually moves, and/or moves the component. Such a prediction can be achieved in a manner similar to that discussed above with respect to step 206, but now for the prediction of the second, or next, assembly stage location. Thus, for example, if the first vision device 114*a* was determined at step 214 to provide the most accurate prediction as to the location of the first assembly stage location, then information provided by the first vision device 114*a*, and not information provided by, for example, the second vision device 114*b*, can be the information that will be used to determine the location to which the robot 106 is to be moved and/or is to position the component. Further, as the workpiece 144 is continuing to move, in such an example, the information provided by the first vision device 114*a* that was used in predicting the first assembly stage location can be different from the information being provided by the first vision device 114*a* for predicting the second assembly stage location.

Additionally, step 218 can also include information provided by other sensors 132 continuing to be used to predict the second assembly stage location in a manner similar to that discussed above with respect to step 206, even if such information is not currently being used in connection with moving the robot 106, or component, to the predicted second assembly stage location.

During the second, or next, assembly stage, upon the robot 106 being operated to move the robot 106 and/or component to the predicted second assembly stage location during step 210, and the actual corresponding position of the workpiece being detected or determined at step 212, an evaluation similar to that discussed above can occur at step 214. Again, such an evaluation can be used to identify the one or more sensors 132 that provided data that resulted in the most accurate prediction of the second stage assembly location. This evaluation can include predictions derived from data that was provided by sensors 132 that both were, and were not, used to provide the predicted second assembly stage location to which the robot 106 actually moved the component. Thus, for example, while the data from the first vision device 114*a* may have been was used to provide the predicted second assembly stage location to which the robot 106 moved the component, the identification at step 214 may, for example, identify the force sensor 134 as providing the data that resulted in the most accurate prediction of the second assembly stage location.

The process may again return to step 216, where a controller of the robot system 100 can determine that at least one assembly stage has been completed. If least one assembly stage has been completed, then at step 220 a controller of the robot system 100 can determine whether any assembly stages remain, or alternatively, if the assembly cycle is complete. If the controller determines that no assembly stages remain, or the assembly is complete, then the assembly cycle can be completed, as indicated by step 222. However, if additional assembly stages remain, the process can proceed to step 224.

At step 224, each of the sensors 132 that were identified at step 214 as providing data that resulted in the most accurate prediction of the associated assembly stage location can be each used to arrive at a predicted stage location for the next assembly stage. Thus, in the current example in which the first vision device 114*a* and force sensor 134 were identified as providing data that resulted in the most accurate predictions of the first and second assembly stage locations, respectively, data from the first vision device 114*a* and data from the force sensor 134 can both be used for deriving the predicted third assembly stage location to which the robot 106 will move the door 180. Moreover, in the illustrated example, data provided by the first vision device 114*a* and force sensor 134, and not data from sensors 132 that were determined to provide less accurate predictions, will be used for providing location information used by the robot 106 to move the door 180 to a location at which the pin(s) 182 of the door hinge portion 184 is/are inserted into the hole(s) 188 of the body hinge portion 186. According to such an example, with the insertion of the pin(s) 182 into the corresponding hole(s) 188, the assembly cycle may be complete, and further evaluation of the sensors 132 during the third assembly cycle may, or may not, occur.

Figure 7:
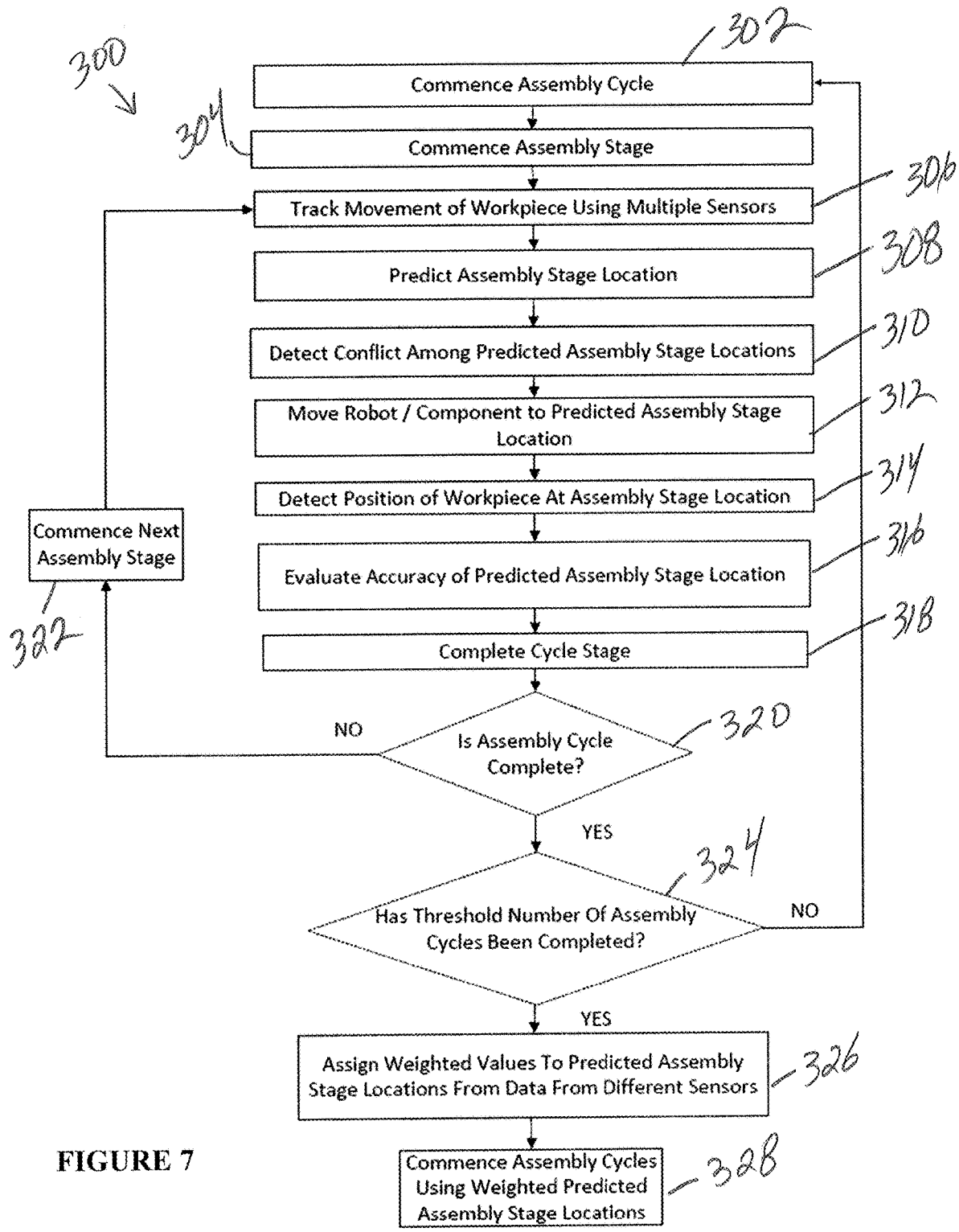
FIG. 7 illustrates another exemplary process for automatic sensor correction in a robot system according to an embodiment of the subject application.

FIG. 7 illustrates another exemplary process 300 for automatic sensor correction in a robot system 100. As discussed below, the process 300 may attempt to utilize a history of performance of the sensors 132 to determine which sensors 132 typically, compared to the other sensors 132, provide a higher level of accuracy or reliability, including, for example, a higher level of accuracy with respect to related predicted assembly stage locations, as discussed above. Based at least on such performance history, sensors 132 that historically have shown to be more accurate may be weighted in a manner that places more value, or prioritizes, the information attained from those particular sensors 132. Thus, for example, in determining a predicted assembly stage location, such as, for example, by the fusion controller 140, predictions based on information from sensors 132 that have a history of being accurate and reliable can have a higher weighted value than similar predictions from other sensors 132 that have historically been less accurate. Moreover, such weighing of the data or information can assist with convergence of the different information provided by the sensors 132, and thereby assist the fusion controller 140 in providing relatively accurate information and instructions for operation of the robot 106.

The process 300 illustrated in FIG. 7 can commence at step 302 with the start of the assembly cycle, followed by, at step 304, the commencement of the first assembly stage, step, or segment of the assembly cycle. Subsequent stages of tracking the movement of the workpiece (step 306), predicting the associated assembly stage location (step 308), detecting a conflict among the predicted assembly stage locations (step 310), moving the robot 106, and thus the component, to the predicted assembly stage location (step 312), detecting the actual position of the workpiece (step 314), and identifying the one or more sensors 132 that provided information that resulted in the most accurate prediction of the assembly stage location, cam be similar to, as well as attained in similar manner, as that discussed above with respect to corresponding steps 204-214 for the process 200 illustrated in FIG. 6.

With respect to step 318, after completion of the assembly stage, a controller of the robot system 100 can determine at step 320 whether the assembly cycle has, or has not been completed, such as, for example, determine whether each assembly stage of the assembly cycle has been completed. If each assembly cycle has not been completed, then at step 322, the assembly cycle can proceed with the next assembly stage, and steps 306-320 can then be repeated.

Upon a determination at step 320 that the assembly cycle has been completed, at step 324 a controller of the robot system 100 can determine whether a threshold hold number of assembly cycles have been completed. For example, at step 324, the controller can determine whether the robot 106, or collection of robots 106 in the robot station 102, has/have performed a threshold number of assemblies in which the robot has attached a door 180 to a car body, among other types of assemblies. Such a determination can be made in a variety of manners, including, for example, by comparing a number of cycles, as maintained via use of a counter, with a threshold number stored in a memory of the robot system 100. The threshold number may be a predetermined number that is set as an attempt to attain a general indication of the historical performances of sensors 132 of the system without undue or excessive influence from potential stand alone or isolated events, incidences, or anomalies. Thus, if at step 324 the determination is made that the threshold number of assembly cycles has not yet occurred, the process 300 can return to step 302, where and another assembly cycle can commence.

If, however, at step 324 it is determined that the threshold number of assembly cycles has been satisfied, then at step 326, historical information relating to the outcomes of evaluations at step 316 of the accuracy of predictions can be used to set weighted values for information of data derived from the different sensors 132. Such weighted values can place an higher emphasis on, or prioritize, information or data from the different sensor(s) 132 that has/have historically provided the most accurate and reliable information. The degree of the weighted used can be relative to the comparative degree of historical accuracy among the different sensors 132. For example, sensors 132 having relatively the same historical degree of accuracy can, according to certain embodiments, generally receive the same degree of weight or prioritization. Further, a collection of sensors 132 that are determined to traditionally provide accurate information can receive a higher weighted value than sensors 132 that have historically have been less accurate. Additionally, there can be sensors 132 having a historical performance that is deemed to be so inaccurate and unreliable to the extent that information from those sensors 132 is weighted in a manner that prevents such information from at least influencing assembly stage location predictions. Again, such weighing of the data or information can assist with convergence of discrepancies in information provided by the sensors 132, and thereby assist the fusion controller 140 in providing relatively accurate information and instructions for operation of the robot 106. Further, different weights can be assigned for different assembly stages. Thus, for example, data or information derived from a sensor 132 may be assigned a relatively high weight or prioritization during one assembly stage, but assigned a different, relatively low weight or prioritization for another, different assembly stage.

The weighted factors can also be modified and/or eliminated in a variety of manners. For example, according to certain embodiments, the historical information relating to the accuracy and reliability of the information can continuously be maintained. Thus, according to certain embodiments, the weighted values can be continuously updated and/or modified to reflect changes in the historical performance of those sensors 132. Alternatively, the weighted values can be modified or updated after a certain predetermined number assembly cycles have been completed. Additionally, according to certain embodiments, the weighted values may be updated, or removed, upon a change relating to one or more sensors 132, including, for example, following recalibration and/or replacement of one or more of the sensors 132, among other possible changes, updates, or modifications. With the predicted assembly stage locations having been assigned weighted values, then at step 328 one or more assembly cycles can commence in which the fusion controller 140 will utilize the weighted values of the predicted assembly stage locations from the various sensors 132 in connection with determining the predicted assembly stage location to which the robot 106 is to move the component.

Figure 8:
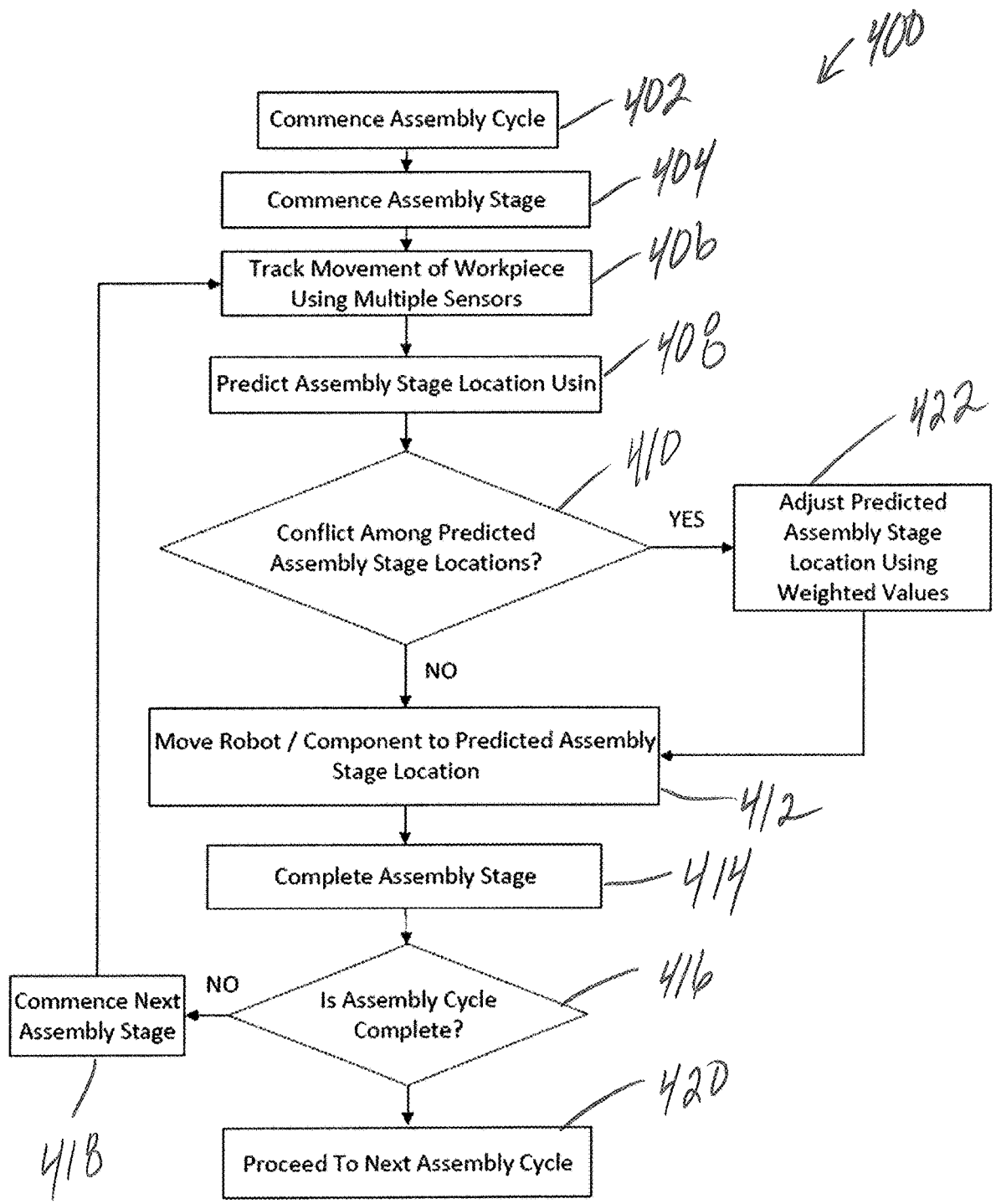
FIG. 8 illustrates a further exemplary process for automatic correction of a conflict between multiple sensors in a sensor fusion robot system according to an embodiment of the subject application.

FIG. 8 illustrates a further exemplary process 400 for automatic correction of a conflict between multiple sensors in a sensor fusion robot system 100. Similar to other processes 200, 300, the process 400 can include step 402, at which an assembly cycle can commence, and which can be followed at step 404 by the first of one or more assembly stages for the assembly cycle. Additionally, the tracking step 406 and the prediction step 408 for the process 400, as shown in FIG. 8, can be similar to tracking step 204 and prediction step 206, respectively, discussed above with respect to process 200, and shown in at least FIG. 6. Thus, upon predicting assembly stage locations at step 408 using at least information obtained by the sensors 132 tracking the workpiece at step 406, the process 400 can include determining at step 410 if there is a conflict between the predicted locations. Similar to step 208 of FIG. 6, determination of such a conflict at step 410 of the process 400 can include differences in the assembly stage locations that is/are predicted by one or more other sensors 132, and/or the differences between the predicted assembly stage locations exceeding a threshold amount, which could be a distance, percentage, angle(s), or other values or representations.

If at step 410 a determination is made that there is no conflict among the predicted assembly stage locations, then at stage 412 the robot 106 can be operated to move the component to the predicted assembly stage location, and the assembly stage can proceed to completion at step 414. A determination can then be made at step 416 as to whether the assembly cycle is complete, and, if not complete, the process can proceed to step 418, at which the assembly can proceed to the next assembly stage for the assembly cycle. Otherwise, if at step 416 a determination is made that the assembly cycle is complete, the process can proceed to step 420, wherein the robot 106 can be moved to prepare for the next assembly cycle.

If however, at step 410 a determination is made that there is a conflict among the predicted assembly stage locations, then at step 422, the predicted assembly stage locations can be assigned different weighted values. The particular weight, or prioritization, assigned to the predicted assembly stage locations can be based on a variety of criteria, including, but not limited to, the particular assembly stage and associated tasks and/or historical information. Additionally, the weighted can also be predetermined. Further, as previously discussed, such weighing of the data or information can assist with convergence of the different information provided by the sensors 132, and thereby assist the fusion controller 140 in providing relatively accurate information and instructions for operation of the robot 106.

For example, during certain assembly stages, or during at least a portion of an assembly stage, the workpiece 144 can be relatively far, and/or disengaged, from one or more sensors 132. More particularly, during an initial assembly stage, a force sensor 134 can have little or no contact with the workpiece 144. In such situations, to the extent the force sensor 134 does have contact with the workpiece 144, such contact may be at a location that is relatively remote from the location at which an assembly operation is to occur, such as, for example, relatively remote from the location of the hole(s) 188 in the body hinge portion 186. In such a situation, during this assembly stage, in the event a conflict is determined at step 410 to exist at this particular assembly stage, information from, or derived from, the force sensor 134 in connection with at least predicting a location of the workpiece may be pre-assigned little, if any, weight. Conversely, during such an assembly stage, the vision devices 114a, 114b may be considered to generally provide more accurate information than the other types of sensors 132, and thus predicted assembly stage locations based on information from either of the vision devices 114a, 114b may, comparatively, be given a relatively high weighted value.

Further, based on information or preconceived beliefs as to the reliability of information from different sensors t different assembly stages, such weighted values, or corresponding prioritization, for the sensors 132 can be predetermined. However, such weighted values or prioritization can be different for different assembly stages. For example, referencing a prior example, a predicted assembly stage location based on information or data from a force sensor 134 relating to an assembly stage in which the pin(s) 182 of the door hinge portion 184 is to be inserted into a hole(s) 188 of the body hinge portion 186 may be assigned a higher weighted value than the corresponding assembly stage location predictions from either one or both of the vision devices 114a, 114b.

The fusion controller 140, or other controller of the robot system 100, can use such weighted predicted assembly stage location(s), as well as the other predicted assembly stage locations from step 408, if any, and determine a predicted assembly stage location for use at step 412 in connection with the robot 106 moving the component, before proceeding to step 414 and continuing toward completion of the assembly process.

Figure 9:
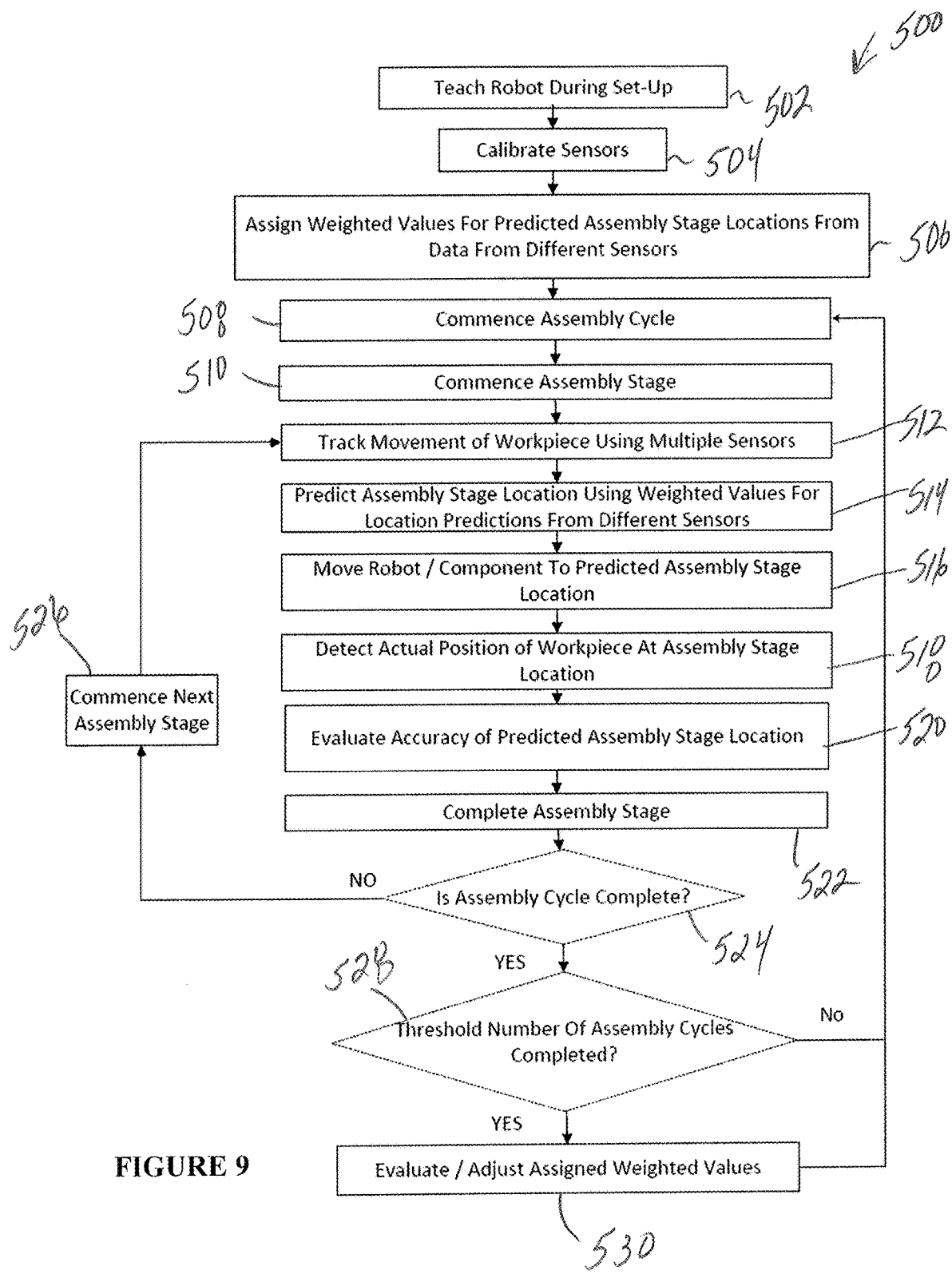
FIG. 9 illustrates an additional exemplary process for automatic correction of a conflict between multiple sensors in a sensor fusion robot system according to an embodiment of the subject application.

FIG. 9 illustrates an additional exemplary process 500 for automatic correction of a conflict between multiple sensors 132 in a robot system 100. The process 500 can begin with a teaching phase at step 502, such as, for example, a teaching phase during the initial set up of the robot 106 and/or robot station 102. Such teaching phase can include, for example, manual teaching and programming of the robot 106, such as, for example teaching associated with a user using a teach pendant that can be used to control at least certain operations of the robot 106. At step 504, the sensors 132 can be calibrated, and the control system 104 can at least initially be tuned. Such calibration of the sensors 132 can include utilizing a variety of different artificial and/or natural tracking features, as previously discussed, as well as comparing information sensed by the sensors 132 with known information. Such initial tuning of the control system 104 can include, for example, initial tuning of the vision servoing 150, sensor fusion, robotic force control, and robot motion.

At step 506, weighted values, or other prioritizations, can be determined and/or assigned for the predicted assembly stage locations that will be at least initially determined during the assembly process. Such predetermined weighted values can be manually assigned or inputted during the initial set up of the robot 106 and/or robot station 102. The particular weight assigned can be based on a variety of criteria, including, but not limited to, the particular assembly stage and associated tasks, observations made by an operator during the setup of the robot 106, and/or historical information. For example, during certain assembly stages, or during at least a portion of a stage, the workpiece 144 can be relatively far from and/or disengaged with one or more sensors 132. In such situations, information provided by such sensors 132 during that assembly stage can be considered to be less accurate or reliable than other sensors 132, and thus predicted assembly stage locations that relay on data from such sensors 132 can be assigned a lower weighted value. Conversely, sensors 132 that traditionally are considered to provide more accurate and reliable predicted assembly stage locations than other sensors 132 may at least initially be assigned a higher weighted value. As previously discussed, such weighing of the data or information can assist with convergence of the different information provided by the sensors 132, and thereby assist the fusion controller 140 in providing relatively accurate information and instructions for operation of the robot 106.

At step 508, the assembly cycle can commence with the start of an assembly stage, as indicated by step 510. Similar to steps 204 and 206 of the process 200 discussed above with respect to FIG. 6, at steps 512 and 514 of the process 500, respectively, the movement of the workpiece 144 can be tracked by a plurality of the sensors 132, and such information can be used to predict the location at which the robot 106 is to position the component that is to be assembled to the workpiece 144. As mentioned above, step 514 can involve such location predictions derived from different sensors 132 being assigned different weight, or emphasis, in connection with the determination by, for example, the fusion controller 140, of where the robot 106 will actually move the component.

At step 516, the robot 106 can move the component to the location determined by the fusion controller 140 from the various weighted location predictions. At step 518, the actual location of the component when moved to the predicted first assembly stage location, and/or the location of the component at the predicted first assembly stage location relative to the workpiece 144 can be determined or sensed, and the robot 106 can, if necessary, be operated to adjust the location of the component accordingly. At step 518, the actual location of the component when moved to the predicted assembly stage location, the actual position of the workpiece 144, and/or the location of the component at the predicted first assembly stage location relative to the workpiece 144 can be determined or sensed, and the robot 106 can, if necessary, be operated to adjust the location of the component accordingly. Based on the known actual locations, at step 520 the accuracy of the predicted assembly stage locations derived from information from the various sensors 132 can be evaluated, such as, for example with respect to the accuracy of the predictions. The results of such evaluations can be recorded, such as, for example, in a memory of the robot system 100 for future use and/or as part of historical data and information.

At step 522, the assembly stage can be completed. A controller of the robot system 100 can determine at step 524 whether the assembly cycle has, or has not been completed, such as, for example, determine whether each assembly stage of the assembly cycle has been completed. If each assembly stage has not been completed, then at step 526, the assembly cycle can proceed with the next assembly stage, and steps 512-524 can then be repeated.

Upon a determination at step 524 that the assembly cycle has been completed, then, similar to step 324 of the process 300 discussed above with respect to FIG. 7, and for at least similar reasons, at step 528 a controller of the robot system 100 can determine whether a threshold hold number of assembly cycles have been completed. If a threshold number of cycles has not been completed, the process may return to step 510, where another assembly cycle can commence. If however a threshold number of assembly cycles have been completed, then at step 530, a controller, such as, for example, the fusion controller 140, can evaluate the past accuracy of the location predictions attained from the sensors 132, such as, for example, using historical evaluation information that was obtained at step 520. Based on the outcome of such an evaluation at step 530, the current weighted values being applied to the location predictions, such as those that had been assigned at step 506, as well as other prior adjustments to the weighted values, can be adjusted at step 530 in an attempt to further improve the accuracy of the location prediction used to move the robot 106, and moreover, to positon the component being held by, or coupled to, the robot 106.

The above-discussed methods provide manners in which the conflicts among sensor information can be automatically resolved, as well as resolved without necessarily having to cease assembly operations. Thus, for example, the above methods can provide auto-correct systems that can relatively accurately overcome variances in reliability amongst different sensors 132, including, but not limited to, differences that can be attributed to sensor drift and degradation in at least some sensors 132 of the robot system 100. Further, the above methods provide a manner of converging ambiguous and/or divergent sensor information in a manner that can accommodate continued relatively accurate robotic operations.

While each of the foregoing processes 200, 300, 400, and 500 provide various approaches to automatic correction to conflicts between sensors 132 in a sensor fusion robot system 100, according to certain embodiments, each process 200, 300, 400, and 500 can be available to the robot system 100. According to such an embodiment, the robot system 100 can selectively use a process 200, 300, 400, and 500 and evaluate the performance or outcome of the process 200, 300, 400, and 500, such as, for example, with respect to accuracy and time for completion. Based on such an evaluation, the robot system 100 can determine, for different assembly operations, including, but not limited to, for each assembly cycle and/or each assembly stage, which process 200, 300, 400, and 500 provided the most effective strategy, and thus which process 200, 300, 400, and 500 is, or is not, to be used during different instances in which conflict between sensors 132 can occur.

Figure 10:
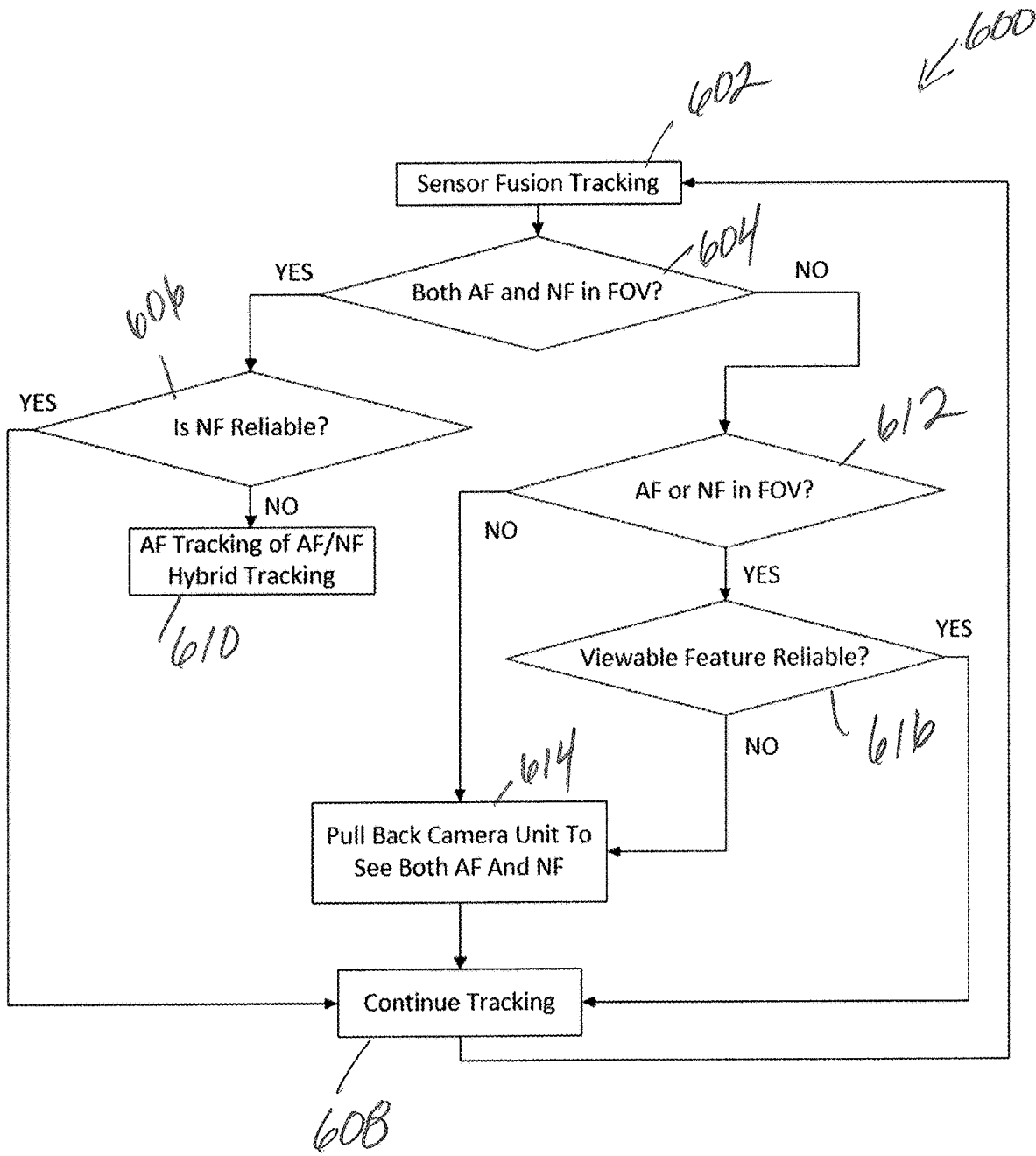
FIG. 10 illustrates a process for dynamically selecting between artificial and natural tracking features, or a hybrid thereof, for sensor fusion tracking according to an embodiment of the subject application.

FIG. 10 illustrates a process 600 for dynamically selecting between artificial and natural tracking features, or a hybrid thereof, for sensor fusion tracking according to an embodiment of the subject application. The illustrated process can dynamically accommodate for situations in which, while a vision device 114*a*, 114*b* is tracking a natural tracking feature, the natural tracking feature falls out of the field of view (FOV) of the vision device 114*a*, 114*b* and/or becomes inaccurate, such as, for example, due to interference associated with noise. In such situations, the below process 600 accommodates a switch from tracking the natural tracking feature to tracking an artificial tracking feature that was also in the FOV, as well as an analysis of the accuracy of the artificial tracking feature. Alternatively, in instances in which the natural tracking feature and the artificial tracking feature are in the FOV and the natural tracking feature becomes inaccurate or unreliable, rather than switching from the natural tracking feature to the artificial tracking feature, the process can use the artificial tracking feature as a reference to improve the accuracy and robustness of the natural tracking feature. Further, the process 600 can dynamically evaluate the quality and reliability of the tracking feature, such as either the natural tracking feature or the artificial tracking feature, during the run time of the sensor fusion tracking.

The process 600 can be implemented in a variety of manners, including, including, but not limited to, analysis and determinations by the vision guidance system 114, vision servoing 150, fusion controller 140, or other controller of the robot system 100 using data and information from an image(s) capture by a vision device(s) 114*a*, 114*b*.

At step 602, the system 100 can proceed with sensor fusion tracking, such as, for example, using the fusion controller 140 and associated inputted information in connection with tracking the movement of a workpiece 144 during an assembly procedure. At step 604, a determination can be made as to whether both an artificial tracking feature, such as, for example a QR code 151, and a natural tracking feature, such as, for example, the side holes 170 in the workpiece 144, are in the FOV of the vision device 114*a*, 114*b* that is tracking the features. For example, at step 604, a determination can be made as to whether both an artificial tracking feature and natural tracking feature are seen in the same image(s) that is being captured by the vision device 114*a*, 114*b*.

If at step 604 a determination is made that both the artificial and natural tracking features are seen in the same FOV, then at step 606, a determination can be made as to whether the natural tracking feature seen in the FOV is reliable. For example, a determination can be made as to the extent noise, a detection quality of the natural feature, including, for example, a low detection quality score for the natural feature, and/or a loss in the visual tracking of the natural feature may be interfering with the ability to accurately detect the location of the natural tracking feature and/or to accurately define the natural tracking feature in the FOV. If the captured image(s) of the natural tracking feature is deemed to be reliable at step 606, then at step 608 the tracking process will continue with the vision device 114a, 114b tracking the natural tracking feature.

If however at step 606 the attempted tracking based on use of the natural tracking feature is determined to, or will, be, unreliable, then at step 610 the tracking will utilize, at least, in part, the artificial tracking feature. The extent to which the artificial tracking feature will be used for tracking in step 610 can depend, for example, on the degree that tracking via use of the natural tracking feature is deemed at step 610 to be unreliable. Thus, for example, in certain instances in which tracking using the natural tracking feature is deemed to be completely unreliable, or would have relatively low reliability, then tracking at step 610 may, at least for a period of time, switch to tracking that uses the artificial tracking feature. However, if tracking using the natural tracking feature is deemed to be at least partially reliable, than, according to certain embodiments, when both the natural and artificial tracking features are seen by the vision device 114a, 114b in the same FOV, step 610 can utilize a hybrid approach wherein the artificial tracking feature is used as a reference, such as reference location, relative to the natural tracking feature, to thereby improve the accuracy and robustness of information detected by the vision device 114a, 114b relating to the visible natural tracking feature.

Returning to step 604, if at step 604 both the artificial tracking feature and the natural tracking feature are determined to not both be in the FOV, then at step 612 a determination is made as to whether either of the artificial tracking feature or the natural tracking feature are in the FOV. If at step 612 the determination is made that neither the natural tracking feature nor the artificial tracking feature are in the FOV, then at step 614, rather than immediately stopping tracking, a command can issue to pull the vision device 114a, 114b back, such as, for example, increase the size of the area captured in the FOV until an artificial tracking feature and a natural tracking feature are both captured in the FOV. Following both the artificial tracking feature and the natural tracking feature being in the field of view, the process can proceed to step 608, in which the vision device 114a, 114b can continue with tracking one or both of the artificial tracking feature and the natural tracking feature.

If however at step 614 the determination is made that one of the natural tracking feature or the artificial tracking feature are in the FOV, then at step 616, a determination can be made as to whether the tracking feature that is being tracked by the vision device 114a, 114b is reliable. For example, again, the ability to detect a defined image of the tracking feature, particularly if noise is present, can at least be examined in determining if the tracking feature in the FOV is reliable. If at step 616 the tracking feature in the FOV is deemed to not be reliable, the process can proceed to step 614, and the vision device 114a, 114b can be pulled back so that both an artificial tracking feature and a natural tracking feature are both seen in the FOV. Otherwise, if at step 616 the tracking feature in the FOV is deemed reliable, then the process 600 can proceed to step 608, and tracking by the vision device 114a, 114b can continue using the reliable tracking feature.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A method comprising:
  tracking, by a plurality of sensors, movement of a workpiece along a robotic assembly operation;
  applying, for each sensor of the plurality of sensors, information obtained by tracking movement of the workpiece to determine a predicted workpiece location;
  determining if a threshold number of assembly cycles have been complete;
  assigning to the predicted workpiece location a weighted value predicated on detecting a conflict between the predicted workpiece location determined for two or more sensors of the plurality of sensors and predicated on a satisfaction of completion of the threshold number of assembly cycles;
  determining, using the predicted workpiece location for each of the plurality of sensors and the weighted value, an adjusted predicted workpiece location; and
  displacing a robot to a location that is determined, at least in part, using the adjusted predicted workpiece location.

2. The method of claim 1, further including:
  detecting an actual location of the workpiece;
  determining an accuracy of the predicted workpiece location for each sensor based on the actual location of the workpiece; and
  adjusting, based on the determined accuracy, the weighted value of the predicted workpiece location for one or more sensor of the plurality of sensors.

3. The method of claim 2, further including the step of compiling a record of the determined accuracies, and wherein adjusting the weighted value is predicated on the accuracies being determined for a threshold number of assembly operations.

4. The method of claim 1, further including the step of determining, for one or more of the plurality of sensors, a value of the weighted value, and wherein the value is at least partially based on a current assembly stage of an assembly cycle.

5. The method of claim 4, wherein the step of determining the value comprises assigning a different value to the weighted value for different assembly stages of the assembly cycle.

6. The method of claim 5, wherein the step of determining the value comprises assigning the value based on a proximity of one or more sensors of the plurality of sensors to the workpiece during one or more of the assembly stages.

7. The method of claim 1, further including the step of determining, for one or more of the plurality of sensors, a value of the weighted value, wherein the value is based on a determined historical accuracy of one or more of the plurality of sensors.

8. The method of claim 1, further including the step of assigning a predetermined value to the weighted value.

9. The method of claim 8, wherein the step of assigning the predetermined value includes determining the value based on an outcome of calibrating one or more of the plurality of sensors.

10. The method of claim 1, further comprising:
detecting if both a natural tracking feature and an artificial tracking feature are in a field of view of a vision device of the plurality of sensors of a vision guidance system;
determining, if both the natural tracking feature and the artificial tracking feature are detected in the field of view, a reliability of the detection of the natural tracking feature; and
referencing the artificial tracking feature for tracking the natural tracking feature based on a determination of the reliability of the natural tracking feature.

11. The method of claim 10, further including the steps of:
determining if only one of the natural tracking feature or the artificial tracking feature is in the field of view;
determining, if only one of the natural tracking feature or the artificial tracking feature is in the field of view, a reliability for the natural tracking feature or the artificial tracking feature that is in the field of view; and
expanding, based on the determined reliability of the natural tracking feature or the artificial tracking feature that is in the field of view, the field of view until both the natural tracking feature and the artificial tracking feature are in the field of view.

12. The method of claim 11, further including:
expanding, if neither the natural tracking feature nor the artificial tracking feature is in the field of view, the field of view of the vision device until both of the natural tracking feature and the artificial tracking feature are in the expanded field of view; and
tracking, upon both the natural tracking feature and the artificial tracking feature being in the expanded field of view, at least one of the natural tracking feature and the artificial feature.

13. A method comprising:
tracking, by a plurality of sensors, movement of a workpiece along a robotic assembly operation;
applying, for each sensor of the plurality of sensors, information obtained by tracking movement of the workpiece to determine a predicted workpiece location;
assigning to the predicted workpiece location a weighted value;
assigning a predetermined value to the weighted value;
determining, using the predicted workpiece location for each of the plurality of sensors and the weighted value, an adjusted predicted workpiece location; and
displacing a robot to a location that is determined, at least in part, using the adjusted predicted workpiece location.

14. The method of claim 13, wherein the step of assigning the predetermined value includes determining the value based on an outcome of calibrating one or more of the plurality of sensors.

* * * * *